JOSEPH S. SMATKO
INVENTOR.

BY Max Geldin
ATTORNEY

United States Patent Office 3,711,336
Patented Jan. 16, 1973

3,711,336
CERAMIC SEPARATOR AND FILTER AND
METHOD OF PRODUCTION
Joseph S. Smatko, Santa Barbara, Calif., assignor to
McDonnell Douglas Corporation, Santa Monica, Calif.
Filed Aug. 5, 1970, Ser. No. 61,383
Int. Cl. H01m 3/02; C01g 23/00; C04b 35/46
U.S. Cl. 136—146
22 Claims

ABSTRACT OF THE DISCLOSURE

Production of a ceramic-like porous potassium titanate member having high strength, fine substantially uniform pore size and resistance to alkali, suitable for use as a battery separator, fuel cell membrane or filter medium, prepared according to one embodiment, by adding an organic binder, particularly a wax such as a polyethylene glycol wax (Carbowax), to potassium titanate fibers, compressing the resulting mixture into blocks, breaking and granulating said blocks into particles, compressing the granules into a member or sheet, slowly heating the resulting member at temperature of about 400 to about 600° C. to decompose the organic binder, and firing the resulting member or sheet at temperature ranging from about 1,000 to 1,370° C.

Figure 1:
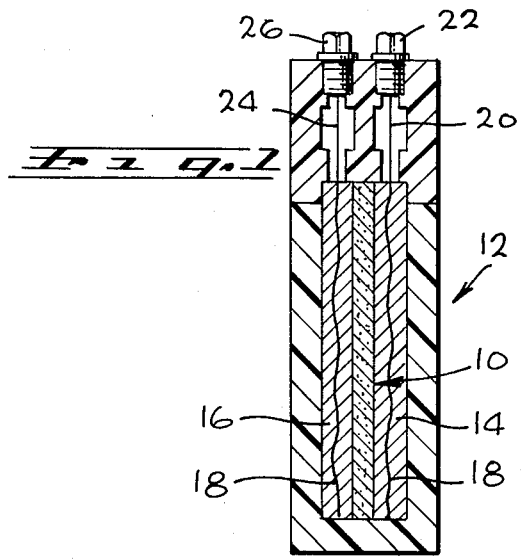

This invention relates to production of members which can be in the form of sheets or membranes, having utility as a battery separator, fuel cell membrane or filter medium, formed from fibrous potassium titanate, and is particularly concerned with production of members of the above type in the form of ceramic-like members having unusually good strength, fine, uniform pore size, high porosity and resistance to corrosive alkali solutions, formed from fibrous potassium titanate, and processed by novel procedure into sintered members having the above improved properties for use in the above noted battery separator, fuel cell membrane and filter medium applications.

Batteries are an important source of energy storage for power generation. An important type of battery particularly suited for such applications are the high energy density alkaline electrolyte cells such as the silver-zinc, zinc-air, nickel-zinc, silver-cadmium and nickel-cadmium batteries. High energy density batteries are generally battery systems which have a substantially higher energy per unit of weight than conventional, e.g. lead, storage batteries. In addition to important airborne applications, such high energy density batteries have many other applications, such as in portable tools and appliances, television, radio and record player, engine starting, portable X-ray units, and the like.

In high energy density batteries such as silver-zinc batteries, the electrodes are placed adjacent opposite sides of a membrane or separator which performs the function of retaining electrolyte, separating the electrodes, and permitting transfer of electrolyte ions while inhibiting migration of electrode ions. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperature.

For alkaline cells or batteries, especially those which have problems with electrode dendrite growth with time, it is most desirable to employ separators that retard or inhibit the growth of such dendrites. This is a major problem with cells or batteries using zinc as anode, and a minor problem with those using cadmium as anode. This problem also applies to fuel cells which comprise electrodes such as one or more catalyst electrodes, with a separator or membrane positioned between such electrodes, and activated by contact of one or more gases with the electrodes of the fuel cell.

Thus, for example in the "Bacon" type of fuel cell which employs hydrogen and oxygen as reactant gases, one cause of failure after prolonged operation, is the growth of nickel dendrites through the asbestos, which is used as the interelectrode separator. By providing a separator that has a multiplicity of very fine pores, and an absence of large pores, such dendrites can be minimized.

In organic ceramic-type separators have been developed which to a large extent avoid or minimize the above noted problems with respect to use of such members as battery separators or fuel cell membranes or separators. Certain of these separators have excellent characteristics as battery separators, such as separators formed from a sintered solid solution of magnesium silicate and iron silicate, or olivine, as described in U.S. Pat. 3,446,668. However, separators of this type when employed in a battery or fuel cell containing a zinc electrode particularly, tend to cause gassing of such electrode, which is an undesirable condition which cannot be tolerated in sealed cells or batteries, because of the resulting pressure build-up.

With respect to fuel cell membranes, although asbestos mat or paper has a high surface area, and functions very well as electrolyte wick, it suffers from chemical degradation and swelling. Such swelling causes fragmentation and loosening of the catalyst disposed on its surfaces and which functions as electrode.

In U.S. Pat. 3,364,077 it is pointed out that titanates, particularly potassium titanate, preferably in the form of fibers or mats, have excellent properties of chemical resistance, porosity, and high temperature stability required for use in battery separators, particularly for high temperature operation. However, as further noted therein, such separators are relatively thin in cross section, and when potassium titanate alone is employed as a separator in a battery, it has insufficient strength for extended periods of operation, and the separator tends to deteriorate, e.g. to tear or pull, particularly due to gas activtiy, rupturing or breaking the separator in a relatively short period of operation and causing short circuiting and failure of the battery.

Thus, the patent points out that while potassium titanate fibrous separators are satisfactory for use in primary batteries, i.e. batteries which are not intended to be recharged, potassium titanate alone is not satisfactory for use in secondary batteries intended to operate efficiently over a large number of charge-discharge cycles, such as a high energy density silver-zinc battery.

The above noted shortcomings of potassium titanate particularly as high energy density separators are overcome according to the above noted 3,364,077 patent, particularly to strengthen such potassium titanate, by mixing potassium titanate fibers with tetrafluoroethylene polymer, or by pressing a thin sheet of microporous tetrafluoroethylene polymer against a surface of a thin membrane of potassium titanate.

It has now been found according to the present invention that an unusually high strength ceramic-like porous potassium titanate membrane or separator, of fine substantially uniform pore size and resistance to alkali, particularly suited for use as a battery separator, as well as a fuel cell membrane or filter medium, can be provided without incorporating organic materials therein, such as the tetrafluoroethylene polymer of the above noted patent, by procedure which comprises adding an organic binder, e.g. a wax-type binder, to fibrous potassium titanate such as loose potassium titanate fibers, compressing the resulting fibrous potassium titanate containing said binder into a desired shape, e.g. a flat sheet or wafer, heating the resulting member, preferably slowly at an intermediate temperature, e.g. of the order of about 500° C., to decompose such organic binder, and firing the resulting potassium titanate member, substantially free of organic binder or residue, at temperature ranging from about 1,000 to about 1,370° C. to sinter such member.

According to a preferred embodiment, potassium titanate fibers, preferably first washed to remove soluble salts, is mixed with a minor portion of organic, e.g. wax-type binder, the resulting mixture compressed and then granulated, the resulting granules then again compressed into the desired shape, e.g. of a wafer or separator, followed by the above noted relatively slow heating at intermediate temperature to remove the binder, and thereafter followed by the above noted firing operation to form the sintered ceramic-like member.

According to another embodiment fibrous potassium titanate paper can be inpregnated with the organic, e.g. wax-type, binder in a solvent, the solvent removed and a plurality of such binder-impregnated potassium titanate sheets compressed together to form a single member or wafer, and the resulting member subjected to the above noted intermediate heating operation to remove binder, followed by the above noted firing operation to produce the ceramic-like potassium titanate membrane.

When employed as a battery separator, as previously indicated, the high strength ceramic-like separator produced according to the invention has good resistance to alkali and to penetration by zinc dendrites, and good conductivity in the electrolyte. In addition, the ceramic-like potassium titanate separator of the invention causes no hydrogen gas to form when in contact with zinc, and therefore is particularly suitable for use in sealed cells. The fibrillar nature of the potassium titanate particles employed as starting material, following firing, provides an interlocking fibrous structure, which contributes to the high strength of the resulting member. In addition, the small dimensions of the potassium titanate fibers preferably employed as starting material, contributes to the small pore sizes in the final separator. Although the sintered potassium titanate separators can be prepared by either of the above noted methods for individual members or wafers, such members can be made in the form of continuous sheets, rods or tubes, since the "green" strength imparted to the initial mixture of potassium titanate fibers by the organic binder, is significant, and is in part due to the interlocking fibrillar characteristics imparted by the potassium titanate fibers.

Another important application of the ceramic-like potassium titanate member of the invention is in fuel cells, wherein such member can function as a combined separator, acting to hold the fuel cell electrodes apart, and at the same time acting as a wick or reservoir for the electrolyte, as it also functions in a battery, but in addition such sintered potassium titanate member can serve as the physical support for the catalytically active electrode surface of the fuel cell. Thus, for example the catalyst can be platinum, palladium or iridium metals, which can be evaporated or sputtered on the sintered potassium titanate membrane surface, without permitting the catalyst metal to enter too deeply into the interior of the potassium titanate separator. Another method of coating the potassium titanate member surface with active metal can be practiced, such as by assembling individual potassium titanate separators produced according to the invention into stacks with suitable metal screens or spacers to provide access of the fuel cell gases to the active catalyst surfaces, thereby creating a compact fuel cell "stack." The high surface area of the porous potassium titanate, fine pore size and the high multiplicity of pores, and good electrolytic conductivity through the pores, renders the sintered potassium titanate membrane of the invention eminently suited for this type of fuel cell structure.

A third important application of the ceramic-like potassium titanate member of the invention is as a filter medium. As previously noted, the fine particle size and interlocking fibrillar nature of the potassium titanate fibers or particles, results in a product that has good strength, fine, uniform pore size and high porosity, such member thus serving admirably as a filter for neutral or corrosive alkaline liquids, even at elevated temperatures. Such membrane also can serve as a gas filter for hot air or other gases, and even corrosive gases such as chlorine, to remove dust. Such filters resist temperature and corrosion and provide lower pressure drops across the membrane than do filters made of other granular materials. The latter effect, that is low pressure drop, results from the fibrillar structure of the potassium titanate membrane. Discs or tubes of the porous potassium titanate ceramic-like material of the invention can be provided and used in instruments employed for air pollution control.

According to a preferred procedure, pigment grade or pigmentary potassium titanate in loose bulk form, having a fiber length of about 1 to about 10 microns, employed as starting material, is preferably first washed in distilled or deionized water. Such washing serves to remove minor amounts of soluble salts such as potassium chloride, sulfates and carbonates. Under certain circumstances, where the presence of such salts may be harmful if the sintered potassium titanate membrane is to be employed in fuel cell operation, as may be the case in certain hydrogen-oxygen fuel cells, then such washing is desirable. However, since the content of the above noted salts in the potassium titanate fibers is usually very small, and since some of the salts will volatilize in any event during the subsequent firing operation, the above noted washing stage is not necessary, but only optional.

After washing, the potassium titanate fibers are filtered to remove most of the water, and then dried. An organic binder, which can be of the types noted in detail below, is then added to the potassium titanate fibers, in an amount of about 0.2 to about 25%, preferably about 0.2 to about 15%, by weight of the mixture, and most desirably about 3 to about 6% by weight. Generally wax-type binders are employed, and suitable waxes which can be used as binders include various types of paraffin wax, polyethylene glycol waxes such as "Carbowax-4000," spermacetti, beeswax, ozokerite, montan, candelila, carnauba, and other vegetable waxes, wax-like materials such as stearic acid, lauric acid, myristic acid, their triglycerides, their glycol esters, hard hydrogenated fats, long chain fatty alcohols, such as stearyl and cetyl alcohols, naphthalene, camphor, pitches and tars that will flow under pressure. Included also as binders with the requisite properties are certain gums and resins which when conditioned with the proper amount of moisture or other solvent are capable of flowing or yielding under pressure. In this category are various gums such as gum arabic, tragacanth, guar, starch, sodium carboxy-methyl-cellulose, methyl cellulose ("methocel"), hydroxy-ethyl-cellulose, polyvinyl alcohol, pectin, polyvinylpyrrolidone, and the like. The term "wax-like material" or "wax-like binder" employed herein and in the claims is intended to denote any of the organic materials listed above. All of the above wax-like materials or binders, under proper conditions, will flow under pressure, providing lubrication for movement of the potassium titanate fibers or particles during densification, or compression, avoiding or minimizing fracture of such fibers or particles, and yet functioning as binder to hold the mass together for handling of the potassium titanate-binder composite in the "green" state, as described below.

The organic binder preferably is added to the mixture of potassium titanate fibers, in solution a solvent such as acetone, in an amount sufficient to form a very thick paste or dough, e.g. containing about 15 to about 25% solids. The dough is then dried in any suitable manner, as by air drying, resulting in a mass having a uniform distribution of the binder within the potassium titanate material. The dried mass preferably is then "slugged," that is, compressed into dense blocks to permit easier granulation. However, alternatively, the binder in molten form can be sprayed on to the surface of a tumbling mass of potassium titanate fibers in a tumbling machine until preferably about 3 to about 6% of binder is added, by weight of the mixture. Also, the potassium titanate fibers and finely powdered binder can be mixed thoroughly. In either of the above alternative procedures, the mass then can be compressed into dense blocks. Such blocks produced according to any of the above procedures preferably are broken up into peanut-size pieces and then granulated by any suitable and known means, e.g. a coffee type grinder or by rubbing through a sieve. Such granules can have a mesh or sieve-size range of from about +200 to about −14 mesh (particles of a size passing through a 14 mesh screen and retained on a 200 mesh screen), such granules being of a convenient size to compress same into separator wafers, sheets or slabs, although the preferred mesh size range is from about +150 to −60 mesh. An alternative procedure to the above noted slugging and granulation procedure, is spray drying using a dilute mixture of the potassium titanate fibers and binder in a solvent such as water, alcohol, hydrocarbon, ketone, and the like, depending on the binder and the equipment used.

The granulated particles are then compressed in molds to produce the desired shape, e.g. in the form of flat sheets or membranes, at pressures which can range for example from about 1,000 to about 20,000 p.s.i., preferably about 5,000 to about 10,000 p.s.i. The compressed sheet, membrane or the like is then removed from the mold and heated, preferably slowly and gradually, up to a temperature in the range of about 400 to about 600° C., e.g. about 500° C., in air to volatilize and burn off organic binder and residue. The specific temperature to which the compressed potassium titanate sheet or membrane containing organic binder is heated for removal of such binder depends in large measure on the particular binder employed.

The resulting compressed porous and fibrous potassium titanate member, free of organic binder and residue, is then further heated in a furnace to temperature in the range from about 1,000 to about 1,370° C., preferably about 1,100 to about 1,300° C., for a period sufficient to sinter the member, generally ranging from about 2 min. up to as much as 24 hours, the longer periods of time being required at the lower sintering temperatures. A convenient temperature-time cycle ranges from about 1,175 to about 1,200° C. for a period for about 5 to about 60 minutes. The resulting sintered member, e.g. as a sheet or membrane, as previously noted, has high porosity and pores of a fine uniform pore size, chiefly as result of the uniform fibrillar nature of the particles or fibers of potassium titanate initially employed as starting material, and the interlocking fibrillar nature of the fibers in the final product, and the removal during initial heating, of the organic binder initially distributed throughout the compressed potassium titanate member. The porosity of the sintered potassium titanate member corresponds to a water absorption ranging from about 8% to about 50%, the term "water absorption" being defined as the ratio of the weight of water absorbed into the pores to the dry weight of the member, multiplied by 100. The pore diameter of the fine pores of the member can range from about 0.05 to about 10 microns.

The sintered porous potassium titanate member has high strength, such members having a modulus of rupture ranging from about 8,000 to about 15,000 p.s.i., and is relatively rigid. Such sintered members can have a thickness generally ranging from about 5 to about 50 mils, particularly for use as battery or fuel cell separators, a desired preferred range for use of such members as separators in high energy density batteries such as silver-zinc cells or batteries ranging from about 15 to about 30 mils. However, such sintered porous potassium titanate members can have any desired thickness, e.g. up to about 0.5 inch or greater, there being no actual limitation on the thickness of the member. Such sintered potassium titanate members have good, that is low, resistivities in 30% KOH solution, ordinarily employed as electrolyte in high energy density batteries and in certain fuel cells, such resistivities at room temperature ranging from about 5 to about 75 ohm-cm., and usually ranging from about 5 to about 50 ohm-cm., depending on the water absorption property (porosity) and tortuosity of the pore system in the sintered potassium titanate member. Apparent density of such members produced according to the invention range from about 1.3 to about 3 grams/cc. The above ranges or properties or characteristics illustrate the latitude of operational parameters which may be applied to obtain the desired properties in the final sintered potassium titanate member.

According to an alternative embodiment, instead of employing potassium titanate fibers in loose bulk form as employed in the procedure described above, porous potassium titanate paper, e.g. having a thickness ranging from about 15 to about 30 mils, is soaked in an organic binder as described above, e.g. a waxy binder such as polyethylene glycol wax (Carbowax), in a suitable solvent such as toluene or acetone, such that a small amount of the binder, e.g. about 2 to about 10%, remains impregnated throughout the paper after solvent evaporation, which is carried out generally at room temperature for a short period of time, e.g. about 10 to about 30 minutes. A number of pieces of such potassium titanate paper impregnated with the organic binder or wax type material, e.g. 4 to 6 pieces of such paper, are stacked in a die and pressed to form a single sheet or wafer, at pressures generally ranging from about 5,000 to about 40,000 p.s.i., preferably about 10,000 to about 25,000 p.s.i.

The compressed stack of potassium titanate papers each impregnated with the organic binder, is subjected to the heating operation at relatively low temperature, e.g. ranging from about 400 to about 600° C. noted above, to remove or decompose the organic binder, followed by firing the resulting compressed stack of potassium titanate papers, free of binder, according to the procedure noted above for the pressed potassium titanate fibers, by heating at temperatures ranging from about 1,000 to about 1,370° C. to sinter the stack of sheets. Thicknesses of the fired stack of potassium titanate papers can range from about 20 to about 50 mils. The resulting wafers or sheets of fired porous potassium titanate papers in the form of a stack, have similar properties to the fired potassium titanate wafer or membrane formed employing bulk potassium titanate fibers as starting material, except that the strength of the wafer or sheet formed by sintering the compressed potassium titanate paper stack or sheets is not as high as that obtained employing the compressed potassium titanate fibers procedure, the modulus of rupture of such sheets generally ranging from about 1,000 to about 7,000 p.s.i. Such reduced weakness of the potassium titanate member formed from the potassium titanate sheets is believed correlated with the higher porosity of such sheets and the residual laminar structure thereof, such porosity generally corresponding to a water absorption ranging from about 25 to about 50%, as compared to the porosity of the member or sheet produced employing bulk potassium titanate fibers.

Figure 2:
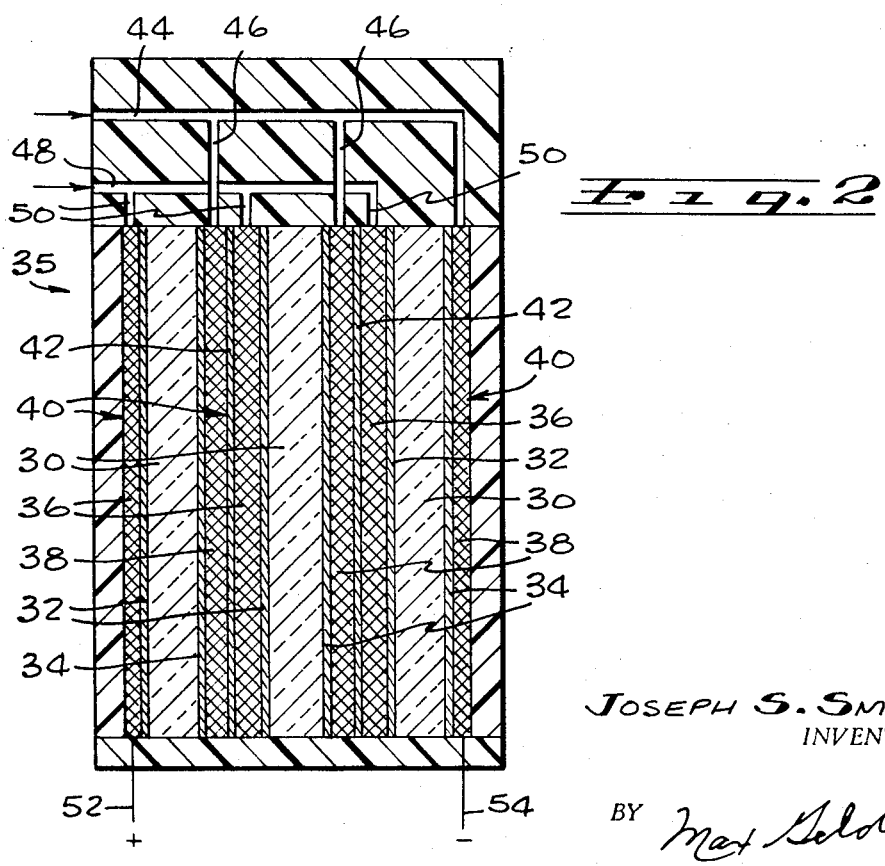

The following are examples of practice of the invention, taken in connection with the accompanying drawing, wherein:

FIG. 1 is a schematic illustration of a battery incorporating a sintered potassium titanate separator produced according to the invention; and FIG. 2 illustrates a fuel cell embodying combined sintered potassium titanate separators as electrode supports, arranged in a "stacked" relation.

EXAMPLE 1

Pigmentary potassium titanate fibers having a length ranging from about 1 to about 10 microns in loose bulk form, is mixed with about 6% by weight of the mixture, of "Carbowax-4000," a polyethylene glycol wax and toluene, a solvent for the wax binder, is added to the mixture such as to produce a thick paste containing about 25% solids by weight. The paste is then dried by warm air, forming a mass having a uniform distribution of the wax binder within the potassium titanate fiber matrix.

The dried mass of potassium titanate fibers having homogeneously distributed therein the wax binder is then compressed into dense blocks by compression at about 10,000 p.s.i. to facilitate granulation, and the resulting blocks are then granulated by rubbing through a sieve, producing granules of a mesh size ranging from about +150 to −60 mesh (particles of a size which pass through 60 mesh but are retained on 150 mesh sieves).

The resulting particles or granules are then placed in a mold and subjected to pressure of about 10,000 p.s.i. to form flat membranes, or pieces, and such pieces of compressed potassium titanate having the waxy binder distributed therein are slowly heated for a period of about 30 minutes to about 500° C. in air, thus volatilizing and decomposing binder and organic residue.

The resulting compressed potassium titanate sheets, free of organic binder and residue, are then heated in a furnace at temperature of about 1,185° C. for thirty minutes. Following cooling, the resulting sintered, or fired, potassium titanate sheets are removed from the furnace.

The resulting sintered potassium titanate sheets or wafers have a thickness of about 20 mils, a porosity corresponding to a water absorption of about 10% and a modulus of rupture for six samples of such sheets ranging from 9,528 to in excess of 13,000 p.s.i. These modulus of rupture values exceed by the order of about 3,000 to about 5,000 p.s.i., or more, the moduli of rupture for comparable sintered olivine wafers, as described in above Pat. 3,446,668, having similar water absorption values.

One of the sintered porous potasium titanate wafers produced as described above, and illustrated at 10 in FIG. 1 of the drawing, is assembled in a battery 12, together with zinc and silver electrodes 14 and 16, respectively, the potassium titanate separator 10 being disposed between the electrodes and in contact with the adjacent surfaces thereof.

Each of the electrodes 14 and 16 has a collector grid 18 therein, the collector grid of the zinc electrode 14 being connected by lead wire 20 to a terminal 22, and the collector grid 18 of the silver electrode 16 being connected by a lead 24 to a terminal 26 on the battery. A 30% potassium hydroxide solution is employed as electrolyte in the battery.

The battery operates successfully both at 25° C. and at 100° C. as a secondary silver-zinc battery over more than 600 charge-discharge cycles at 50% depth of discharge.

EXAMPLE 2

The procedure of Example 1 is followed, except that the initial potassium titanate fibers in loose form are first washed in four changes of distilled water, removing minor amounts of soluble salts including potassium chloride, sulfates, and carbonates. After washing, the aqueous mixture of the potassium titanate fibers is filtered, removing most of the water, and the moist mat of loose potassium titanate fibers is dried at ambient temperature.

Following such drying, the waxy binder and solvent are added thereto, and the procedure described above in Example 1 thereafter carried out.

The resulting sintered or fired potassium titanate sheets or wafers have substantially the same properties as the sintered potassium titanate wafers produced according to the procedure of Example 1.

EXAMPLE 3

Loose bulk potassium titanate fibers as described in Example 1, are first washed according to the procedure described in Example 2 employing deionized water.

The washed and dried potassium titanate fibers are then processed according to the procedure of Example 1 above, including addition of the waxy binder and solvent, removal of solvent, compression into blocks, granulation, compression into wafers, and the heating and sintering procedures in Example 1, except that the wafers are sintered or fired at 1,150° C. for two hours.

The resulting high strength sintered potassium titanate wafers have a modulus of rupture of about 11,000 p.s.i., a porosity corresponding to a water absorption of 21.3%, an apparent density of 2.04 grams/cc. and a resistivity of 7.4 ohm-cm.

Platinum metal is sputtered on opposite surfaces of a plurality of the sintered potassium titanate wafers produced as described above, by conventional sputtering means. Three such ceramic-like wafers, illustrated at 30 in FIG. 2 of the drawing, containing platinum catalyst, indicated at 32 and 34 on opposite surfaces thereof, are assembled in "stacked" relation in a fuel cell, indicated at 36, with expanded metal screens 36 and 38 in contact with opposite catalyst surfaces 32 and 34, respectively, to provide gas passages to such catalysts, serving as electrodes. Each of the assemblies 40, composed of a single potassium titanate separator or wafer 30 having the catalyst surfaces 32 and 34 thereon and the adjacent expanded metal screens 36 and 38, is separated from the adjacent assembly 40 by an impervious nickel or platinum foil 42.

Hydrogen gas is passed via conduits 44 and 46 to the expanded metal screen 38 adjacent the hydrogen catalyst electrodes 34, and oxygen is fed via conduits 48 and 50 to the expanded metal screens 36 and into contact with the oxygen catalyst electrodes 32, the porous ceramic-like potassium titanate separators 30 being filled with 30% potassium hydroxide solution, causing reaction of the gases and producing a current in the fuel cell, by appropriate electrical connections to leads 52 and 54, which are connected to collector screens 36 and 38 in contact with the oxygen and hydrogen catalyst electrodes 32 and 34, respectively. The hydrogen-oxygen fuel cell described above and illustrated in FIG. 2 of the drawing, employing the ceramic-like potassium titanate separators or wafers according to the present invention, operates over an extended period of time both at ambient and elevated temperatures without chemical degradation, swelling, or physical disintegration of the potassium titanate separators 30 or catalyst surfaces 32 and 34.

The same type of fuel cell as described above and illustrated in FIG. 2 of the drawing, but employing asbestos mats or papers with separate catalyst electrodes, instead of the ceramic-like potassium titanate separators 30 with catalyst deposited thereon, described above according to the invention, although having high surface area and functioning well as electrolyte wick, are subject to chemical degradation, and swelling of such mats, causing fragmentation and loosening of the catalyst employed as electrodes, after a period of operation of substantially shorter duration as compared to the above noted potassium titanate separators of the invention.

Further, the potassium titanate separators of the invention have the advantage that catalyst metal such as platinum can be applied, as by sputtering or evaporation of the metal, to the surface of the separator to form an integral separator-electrode combination whereas conventional fuel cell separators such as asbestos mats cannot be so treated to form an integral separator-electrode combination.

EXAMPLE 4

76.1 grams of pigmentary grade potassium titanate is placed in a blender. 300 cc. of water, containing 2.28 grams of Carbowax 4000 is added, and the mixture is mixed for 5 minutes to give a smooth creamy thick suspension, which is filtered to give a rather dry cake. The cake is further dried for 2 hours at 110° C. The cake is broken up and remixed by hand with sufficient solution of 3% Carbowax 4000 in acetone to give a thick paste. The paste is constantly stirred by hand in the draft of a fan until all the acetone is evaporated. The small crumbs are sieved to yield a fraction +200, −60 mesh to give a granulation suitable for pressing. Plaques are pressed at 10,000 p.s.i., having a "green" thickness of 39–41 mils. The organic matter is fired off at 500° C. for 30 minutes, and the resulting plaques are sintered at 1,185° C. for 30 minutes, to yield plaques of 23–25 mils thickness, having water absorptions averaging 9.9%, an average apparent density of 2.65 grams/cc., and moduli of rupture ranging from 9,528 to 13,542 p.s.i., and resistivities ranging from 35–55 ohm-cm.

EXAMPLE 5

60 grams (dry weight) of previously washed potassium titanate fibers is blended with 600 cc. of acetone, 12 cc. water and 3.6 grams Carbowax 4000. The blended slurry is dried under constant mixing in a draft of air until dry. The crumbs are sieved to +200, −60 mesh fraction, and such fraction pressed into plaques at 10,000 p.s.i. Removal of binder and organic residue is carried out at about 600° C. for 20 minutes, and sintering is carried out at 1,175° C. for 2 hours to yield separators 18–20 mils thick. Water absorptions on 2 separators from the lot range 14.5–14.7% with an average apparent density of 2.32 g./cc. Resistivities of the 2 selected specimens are 15.2 and 15.3 ohm-cm., respectively.

EXAMPLE 6

Sheets of porous potassium titanate paper averaging 22 to about 28 mils in thickness, are soaked in polyethylene glycol binder (Carbowax-4000) in 8% toluene as a solvent, and the resulting papers are then dried at ambient temperature to remove the solvent. The resulting dried potassium titanate papers are uniformly impregnated with about 5% of the polyethylene glycol wax after solvent evaporation.

Four pieces of such wax-impregnated potassium titanate papers are stacked in a die and are pressed to form a single wafer at about 20,000 p.s.i.

The compressed stack of potassium titanate papers each impregnated with the wax binder, is then subjected to heating to remove the organic binder and organic residues, and to firing, according to the procedure described above in Example 1.

The resulting fired potassium titanate membrane is relatively rigid, and has a thickness of about 20 to 21 mils, with porosity as measured by water absorption being about 35%. The strength of the resulting fired potassium titanate wafer is about 4,000 p.s.i., which it is noted is not as strong as the potassium titanate wafer produced according to Example 1.

The resulting wafer of the present example has high conductivity of the order of about 5 ohm-cm., and when incorporated in a fuel cell as described above and illustrated in FIG. 2, operates efficiently over a long period of fuel cell operation.

EXAMPLE 7

The procedure of Example 6 above is repeated, except employing six pieces of potassium titanate paper instead of the four pieces in Example 6.

The resulting thickness of the fired ceramic-like potassium titanate wafer is about 30 mils, and has substantially the same advantageous properties as the potassium titanate wafer produced in Example 6.

EXAMPLE 8

The ceramic-like potassium titanate wafers produced according to the procedures of Examples 6 and 7 are employed as a filter for corrosive alkali solutions and also as a filter for hot air containing dust particles.

In both instances, the sintered potassium titanate filter media of Examples 6 and 7 operate successfully to remove solids and contaminants such as dust from the hot air, over long periods of time without degradation and loss of efficiency, including periodic treatment intervals for removal of solid contaminants from the pores of the filters.

EXAMPLE 9

The procedure of Example 1 is repeated except that in place of the polyethylene glycol wax, other organic or wax-like binders, including ozokerite and carnauba wax, stearic acid, pitch, gum arabic and methyl cellulose (Methocel) are employed.

In each case temperature of initial heating is adjusted in the range of 400 to 600° C. to remove the particular organic binder employed, prior to the firing operation as described in Example 1.

The resulting ceramic-like potassium titanate wafers or members, have substantially the same advantageous properties as those produced according to Example 1.

The advantages of the present invention with respect to the ceramic-like potassium titanate members produced according to the invention, particularly as relates to their use as separators in high energy density batteries such as silver-zinc cells, are good chemical resistants of such separators to concentrated KOH, high strength, easy fabrication, fabrication from low cost starting materials requiring a minimum of initial processing, commercial availability of potassium titanate starting material, easy sinterability of such material in air or in any desired gas atmosphere to yield desired porosities at temperatures in the range of conventional electric heating elements, very fine pore structure and interlocking fibrillar structure, and a complete absence of contribution to gassing of zinc electrodes in a battery, rendering such potassium titanate separators especially suitable for use in sealed zinc-containing cells.

For compact fuel cells, the ceramic-like potassium titanate wafers of the invention serve as substrate for the deposition of catalytically active electrode metals, while functioning at the same time as physical separator, absorber for the electrolyte and as structural member. The properties of functioning as an excellent wick or blotter, while being of high strength and having high surface area for the deposition of the electrode catalysts, are important advantages. Such separators can also be used as electrolyte absorber in a conventionally assembled fuel cell employing separate catalyst electrodes which are not deposited on the separators. Use of such potassium titanate separators in a fuel cell provides high volumetric density in fuel cells, while still employing modest current densities.

With respect to their use in filters, the good strength, fine pore size, high porosity for good flow rates, and fibrillar structure, together with easy fabrication into any desired shape, excellent resistance to high temperature and corrosive gases, are particularly noteworthy.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. Process for preparing a ceramic-like porous potassium titanate membrane having high strength, fine substantially uniform pore size and resistance to alkali, suitable for use as a battery separator, fuel cell membrane or filter medium, which comprises adding an organic wax-type binder to a material consisting essentially of fibrous potassium titanate, compressing the resulting fibrous potassium titanate containing said binder into a member, heating said member at temperature to decompose said organic binder and firing the resulting potassium titanate member at temperature ranging from about 1,000 to about 1,370° C. for a period sufficient to sinter said member.

2. Process as defined in claim 1, wherein said heating is carried out slowly at temperatures ranging from about 400 to about 600° C., and said firing is carried out at temperatures ranging from about 1,100 to about 1,300° C.

3. Process as defined in claim 1, wherein said fibrous potassium titanate is first washed with an aqueous solution to remove any soluble salts.

4. Process as defined in claim 1, wherein said binder is employed in an amount of about 0.2 to about 25% by weight of the mixture.

5. Process as defined in claim 4, wherein said binder is selected from the group consisting of paraffin wax, polyethylene-glycol waxes, spermacetti, beeswax, ozokerite, montan, candelila, carnauba wax, stearic acid, lauric acid, myristic acid, their triglycerides, their glycol esters, hard hydrogenated fats, long chain fatty alcohols, naphthalene, camphor, pitches and tars that will flow under pressure, gums and resins.

6. Process as defined in claim 1, employing potassium titanate fibers, said binder employed in an amount of about 0.2 to about 15% by weight of the mixture, compressing the resulting mixture into blocks, breaking said blocks and granulating same, compressing the resulting granules at pressure of about 1,000 to about 20,000 p.s.i. into a membrane, slowly heating said membrane at temperature ranging from about 400 to about 600° C. to decompose the organic binder and firing said membrane at temperature ranging from about 1,000 to about 1,370° C. to sinter said membrane.

7. Process as defined in claim 6, wherein said binder is selected from the group consisting of paraffin wax, polyethylene-glycol waxes, spermacetti, beeswax, ozokerite, montan, candelila, and carnauba wax, in an amount of about 0.2 to about 15% by weight, said blocks being granulated to pieces of mesh size ranging from +200 to −14 mesh size, said compressing said granules being carried out at pressures of about 5,000 to about 10,000 p.s.i., said heating being carried out at temperature ranging from about 400 to about 600° C., and said firing being carried out at temperature ranging from about 1,100 to about 1,300° C. for a time ranging from about 2 minutes to about 24 hours.

8. Process as defined in claim 5, wherein said binder is a polyethylene glycol wax employed in an amount of about 0.2 to about 15% by weight of the mixture.

9. Process as defined in claim 6, including first washing said potassium titanate fibers with distilled or deionized water and removing minor amounts of soluble salts, removing the water and drying the resulting potassium titanate fibers prior to addition of said binder.

10. Process as defined in claim 9, wherein said binder is selected from the group consisting of paraffin wax, polyethylene-glycol waxes, spermacetti, beeswax, ozokerite, montan, candelila, and carnauba wax, in an amount of about 0.2 to about 15% by weight, said blocks being granulated to pieces of mesh size ranging from +200 to −14 mesh size, said compressing said granules being carried out at pressures of about 5,000 to about 10,000 p.s.i., said firing being carried out at temperature ranging from about 1,100 to about 1,300° C. for a time ranging from about 2 minutes to about 24 hours.

11. Process as defined in claim 1, wherein said fibrous potassium titanate is potassium titanate paper, said binder being added to said potassium titanate paper by impregnating same with a solvent solution of a binder in the form of a wax-type material, removing the solvent from said paper, stacking a plurality of said papers impregnated with said binder, compressing said papers at pressures of about 5,000 to about 40,000 p.s.i., and subjecting said compressed stacked papers to said heating and firing operations.

12. Process as defined in claim 11, wherein said binder is a polyethylene glycol wax in a solvent, said compressing is carried out at pressures in the range of about 10,000 to about 25,000 p.s.i., and wherein said heating is carried out slowly at temperatures ranging from about 400 to about 600° C. and said firing is carried out at temperatures ranging from about 1,100 to about 1,300° C.

13. A ceramic-like porous potassium titanate member of interlocking fibrillar structure, having high strength, fine substantially uniform pore size and resistance to alkali, suitable for use as a battery separator, fuel cell membrane or filter medium, produced by the process of claim 1.

14. A ceramic-like porous potassium titanate battery separator as defined in claim 13, said separator having a modulus of rupture ranging from about 8,000 to about 15,000 p.s.i., a porosity corresponding to a water absorption ranging from about 8 to about 50%, an apparent density ranging from about 1.3 to about 3 grams/cc., and permitting freedom from hydrogen gas evolution when in contact with zinc.

15. A ceramic-like porous potassium titanate fuel cell membrane as defined in claim 13, said fuel cell membrane having a modulus of rupture of the order of about 8,000 to about 15,000 p.s.i., low resistivity ranging from about 5 to about 75 ohm-cm., an apparent density ranging from about 1.3 to about 3 grams/cc., and a porosity corresponding to a water absorption ranging from about 8 to about 50%, said membrane having a high surface area.

16. A fuel cell membrane as defined in claim 15, containing catalyst on a surface of said membrane.

17. A fuel cell assembly comprising a plurality of stacked fuel cell membranes as defined in claim 16.

18. A ceramic-like porous potassium titanate member of interlocking fibrillar structure, having high strength, fine substantially uniform pore size and resistance to alkali, suitable for use as a battery separator, fuel cell membrane or filter medium, produced by the process of claim 2.

19. A ceramic-like porous potassium titanate member of interlocking fibrillar structure, having high strength, fine substantially uniform pore size and resistance to alkali, suitable for use as a battery separator, fuel cell membrane or filter medium, produced by the process of claim 7.

20. A battery comprising a pair of electrodes of opposite polarity and a ceramic-like porous potassium titanate battery separator as defined in claim 14, disposed between said electrodes.

21. A high energy density battery comprising a pair of electrodes of opposite polarity and a ceramic-like porous potassium titanate battery separator as defined in claim 18, disposed between said electrodes.

22. A high energy density battery comprising zinc and silver electrodes and a ceramic-like porous potassium titanate battery separator as defined in claim 19, disposed between said electrodes.

References Cited
UNITED STATES PATENTS

| | | | |
|---|---|---|---|
| 3,380,847 | 4/1968 | Lewis et al. | 23—51 R |
| 3,539,394 | 11/1970 | Arrance | 136—146 |
| 3,364,077 | 1/1968 | Arrance et al. | 136—146 |
| 3,129,105 | 4/1964 | Berry et al. | 106—55 |
| 3,514,403 | 5/1970 | Muendel | 23—51 R |

DONALD L. WALTON, Primary Examiner

U.S. Cl. X.R.

23—51 R; 106—55; 136—86 R, 148; 204—295